US009632854B2

(12) United States Patent
Helgeson et al.

(10) Patent No.: US 9,632,854 B2
(45) Date of Patent: *Apr. 25, 2017

(54) ELECTRONIC SYSTEM CONFIGURATION MANAGEMENT

(71) Applicant: International Business Machines Corporation, Armonk, NY (US)

(72) Inventors: Lee N. Helgeson, Rochester, MN (US); Stephen J. Ren, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/533,221

(22) Filed: Nov. 5, 2014

(65) Prior Publication Data

US 2016/0124787 A1 May 5, 2016

(51) Int. Cl.
*G06F 11/00* (2006.01)
*G06F 11/07* (2006.01)
*H04L 12/24* (2006.01)

(52) U.S. Cl.
CPC ........ *G06F 11/0709* (2013.01); *G06F 11/008* (2013.01); *G06F 11/0754* (2013.01);
(Continued)

(58) Field of Classification Search
CPC .............. G06F 11/079; G06F 11/0709; G06F 11/0754; G06F 11/008; G06N 5/04;
(Continued)

(56) References Cited

U.S. PATENT DOCUMENTS

2003/0163489 A1  8/2003  Tonack et al.
2004/0230861 A1  11/2004  Bailey et al.
(Continued)

FOREIGN PATENT DOCUMENTS

EP   0505691 A1   9/1992
WO   2013066887 A1   5/2013

OTHER PUBLICATIONS

Helgeson et al., "Electronic System Configuration Management," U.S. Appl. No. 14/549,580, filed Nov. 21, 2014.
(Continued)

*Primary Examiner* — Yair Leibovich
(74) *Attorney, Agent, or Firm* — Nicholas D. Bowman

(57) ABSTRACT

A method for managing a configuration of an electronic system having a plurality of locations configured to receive hardware units is disclosed. The method may include receiving hardware unit parameters corresponding to hardware units currently installed and pending installation in the electronic system and retrieving configuration data for the electronic system. The method may also include generating a plurality of hardware unit times to failure (TTFs) for the plurality of locations by applying, to a failure prediction model, the hardware parameters for hardware units currently installed and pending installation and the configuration data for the electronic system. The method may also include using a selection criteria to select the plurality of hardware unit predicted TTFs corresponding to the plurality of locations and reporting at least one recommended hardware unit installation location from the plurality of locations within the electronic system.

12 Claims, 8 Drawing Sheets

(52) U.S. Cl.
CPC ...... *H04L 41/0806* (2013.01); *H04L 41/0853* (2013.01); *H04L 41/12* (2013.01); *H04L 41/147* (2013.01)

(58) Field of Classification Search
CPC . H04L 41/12; H04L 41/0806; H04L 41/0853; H04L 41/147; H04L 41/008
USPC .......................................................... 714/1
See application file for complete search history.

(56) References Cited

U.S. PATENT DOCUMENTS

| | | |
|---|---|---|
| 2004/0260857 A1 | 12/2004 | Henderson et al. |
| 2006/0064592 A1 | 3/2006 | Czerwinski et al. |
| 2010/0299419 A1 | 11/2010 | Ramankutty et al. |
| 2012/0054544 A1 | 3/2012 | Floyd et al. |
| 2013/0159787 A1 | 6/2013 | Yingling, Jr. et al. |
| 2013/0185667 A1 | 7/2013 | Harper et al. |
| 2014/0047342 A1 | 2/2014 | Breternitz et al. |
| 2014/0215279 A1 | 7/2014 | Houseman et al. |
| 2016/0127178 A1* | 5/2016 | Helgeson .............. G06F 11/079 709/222 |

OTHER PUBLICATIONS

List of IBM Patents or Patent Applications Treated as Related.

Verma et al., "pMapper: Power and Migration Cost Aware Application Placement in Virtualized Systems," Proceedings of the 9th ACM/IFIP/USENIX International Conference on Middleware, pp. 243-264, Springer-Verlag New York, Inc. New York, NY, USA © 2008 ISBN:3-540-89855-7.

Mell et al., "The NIST Definition of Cloud Computing," National Institute of Standards and Technology, U.S. Department of Commerce, Special Publication 800-145, Sep. 2011.

* cited by examiner

ELECTRONIC SYSTEM CONFIGURATION MANAGEMENT

BACKGROUND

The present disclosure generally relates to configuration management of electronic systems. In particular, this disclosure relates to generating hardware unit placement recommendations to manage electronic system availability.

A field replaceable unit (FRU) may be hardware (e.g., a printed circuit board, electronic module or assembly) that is part of an electronic system such as a computer or server, and which may be quickly and easily removed and replaced by a user or a technician. FRUs may allow a user or technician lacking in-depth product knowledge to isolate and replace faulty components or upgrade an electronic system without having to send the entire system to a repair facility. FRUs may be included in commercial and certain high-end consumer products.

Types of FRUs contained within electronic systems may include memory modules, central processing units (CPUs), data storage hardware such as hard disk drives and solid-state drives, input/output (I/O) adapters, power supply units and other standardized electronic modules and/or assemblies. A FRU may be designed to have standard dimensions and/or include a standardized electrical connector that allows it to be used interchangeably with similar FRUs within an electronic system. Incorporating FRUs into the design of electronic systems may be useful in reducing the total cost of system ownership as well as the cost of system maintenance and support costs.

SUMMARY

Various aspects of the present disclosure may be useful for increasing electronic system availability by issuing, based upon analysis of hardware unit and electronic system parameters, recommended locations for new hardware units. An electronic system configured according to embodiments of the present disclosure may have a high availability, reliability, and predictable performance. An electronic system according to embodiments may have reduced overall hardware replacement and maintenance costs.

Embodiments may be directed towards a method for managing a configuration of an electronic system having a plurality of locations each configured to receive a hardware unit. The method may include receiving a set of hardware parameters corresponding to a hardware unit to be installed in the electronic system and retrieving configuration data for the electronic system and at least one set of hardware parameters corresponding to at least one hardware unit installed in the electronic system. The method may also include generating a plurality of hardware unit predicted times to failure (TTFs) corresponding to the plurality of locations within the electronic system by applying, to a failure prediction model, the set of hardware parameters corresponding to the hardware unit to be installed in the electronic system, the configuration data for the electronic system, and the at least one set of hardware parameters. The method may also include selecting, based on a selection criteria, the plurality of hardware unit predicted TTFs corresponding to the plurality of locations and reporting, based on the selected plurality of hardware unit predicted TTFs and for the hardware unit to be installed in the electronic system, a recommended location from the plurality of locations within the electronic system.

Embodiments may also be directed towards a computer program product for managing a configuration of an electronic system having a plurality of locations each configured to receive a hardware unit. The computer program product may include a computer readable storage medium having stored program instructions executable by one or more processor circuits. The stored program instructions may be executable to cause the one or more processor circuits to receive a set of hardware parameters corresponding to a hardware unit to be installed in the electronic system and retrieve configuration data for the electronic system and at least one set of hardware parameters corresponding to at least one hardware unit installed in the electronic system. The stored program instructions may also be executable to cause the one or more processor circuits to generate a plurality of hardware unit predicted TTFs corresponding to a plurality of locations within the electronic system by applying, to a failure prediction model, the set of hardware parameters corresponding to the hardware unit to be installed in the electronic system, the configuration data for the electronic system, and the at least one set of hardware parameters. The stored program instructions may also be executable to cause the one or more processor circuits to select, based on a selection criteria, the plurality of hardware unit predicted TTFs corresponding to the plurality of locations and to report, based on the selected plurality of hardware unit predicted TTFs and for the hardware unit to be installed in the electronic system, a recommended location from the plurality of locations within the electronic system.

Embodiments may also be directed towards a system for managing a configuration of an electronic system having a plurality of locations each configured to receive a hardware unit. The system may include one or more processor circuits. The one or more processor circuits may be configured to receive a set of hardware parameters corresponding to a hardware unit to be installed in the electronic system and retrieve configuration data for the electronic system and at least one set of hardware parameters corresponding to at least one hardware unit installed in the electronic system. The one or more processor circuits may also be configured to generate a plurality of hardware unit predicted TTFs corresponding to a plurality of locations within the electronic system by applying, to a failure prediction model, the set of hardware parameters corresponding to the hardware unit to be installed in the electronic system, the configuration data for the electronic system, and the at least one set of hardware parameters. The one or more processor circuits may also be configured to select, based on a selection criteria, the plurality of hardware unit predicted TTFs corresponding to the plurality of locations and report, based on the selected plurality of hardware unit predicted TTFs and for the hardware unit to be installed in the electronic system, a recommended location from the plurality of locations within the electronic system.

Aspects of the various embodiments may be used to reduce premature failure of electronic system components. Aspects of the various embodiments may also be useful for providing a cost-effective method for use with configurable electronic equipment systems, by using existing and proven software and database technologies and analytical methods.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
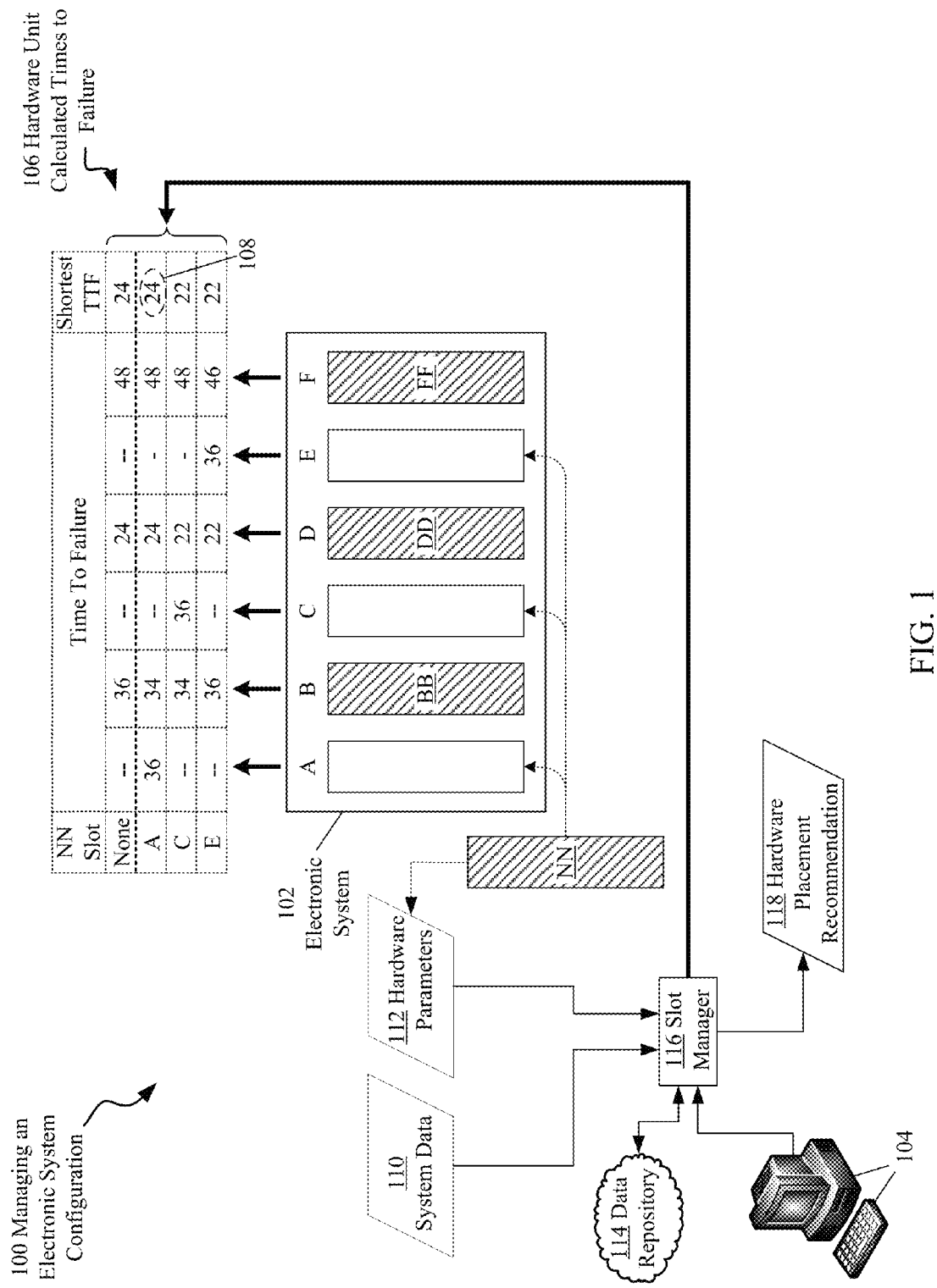
FIG. 1 includes a block diagram and a table depicting the management of an electronic system hardware configuration through a slot manager, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of managing the availability of an electronic system by generating placement recommendations for new hardware units for electronic equipment such as servers, which may be used to provide data to clients attached to a server through a network. Such servers may include, but are not limited to web servers, application servers, mail servers, and virtual servers. While not necessarily limited thereto, embodiments discussed in this context can facilitate an understanding of various aspects of the disclosure. Certain embodiments may also be directed towards other equipment and associated applications, such as managing the availability of an electronic system for electronic equipment such as computers and computing systems, which may be used in a wide variety of computational and data processing applications. Such computing systems may include, but are not limited to, supercomputers, high-performance computing (HPC) systems, rack-mounted and other types of special-purpose computers. Embodiments may also be directed towards other equipment and associated applications, such as managing the availability of an electronic system for network switching systems which may be used in a wide variety of local-area and wide-area networking applications.

For ease of discussion, the term "slot manager" is used herein, and may generally refer to software configured to issue recommendations regarding placement of hardware units in compatible locations (slots) within an electronic system. Other terms which may refer to software having a similar or consistent function may include "hardware configurator", "system configurator" or "configurator program".

An electronic system having locations that can receive replaceable hardware units may be upgraded through the addition of new hardware units. For example, additional memory modules or central processing units (CPUs) may be added to a computer system in order to enhance its computational capabilities. Periodic maintenance of a computer or other electronic system may also include swapping out installed hardware units, such as CPUs or memory modules, with new hardware units, in order to ensure high reliability of the system. An upgradable electronic system may have multiple locations suitable to receive a new hardware unit. For example, a computer system may have a total of eight memory slots of which two are populated, leaving six possible locations for the addition of new memory modules.

Software such as a slot manager program may be used to determine one or more suitable locations, within the electronic system, in which to install new or replacement hardware units. For example, a slot manager program may receive as input the number and types of memory modules to be installed in a computer system, may analyze the available memory slots, and subsequently issue a recommendation of suitable installation locations. The slot manager may analyze installation slot choices and issue recommendations in response to received hardware parameters such as memory module slot type, hardware unit dimensions, operating voltage and cooling airflow requirements and operational objectives for the memory modules. Operational objectives may include, for example, maximized performance or predicted reliable operating life.

Hardware unit slot recommendations issued by a slot manager program that analyzes only parameters and operational objectives related to a single type of hardware unit (e.g., a memory module) may cause, if implemented, performance and/or operating life degradation in the hardware unit(s) and/or the electronic system. For example, the installation of new memory modules in locations adjacent to a CPU module may restrict cooling airflow to the CPU module, causing it to operate at a higher than specified temperature, and to fail prematurely. Premature failure of a CPU or other component may cause unintended and unexpected computer system downtime.

According to embodiments of the present disclosure, a set of installation recommendations for at least one hardware unit pending installation, based upon a set of system data and hardware parameters for both currently installed hardware units and hardware units pending installation, may be generated by a slot manager. Hardware units currently installed and pending installation may be of multiple types, e.g., CPU, memory, I/O cards and power supply units. Such installation recommendations may be useful in efficiently and effectively managing electronic system availability. A slot manager configured to receive hardware parameters and system data for multiple types of hardware units may be used to calculate sets of predicted times to failure (TTF) that are based upon known and characterized interactions between hardware units and/or the electronic system.

A TTF may quantify a time interval, from the present time, or from a date of calculation, to a predicted failure date of a hardware unit. A "base" or "original" TTF may based on warranty data or historical failure data used to predict a mean or statistical failure date for a particular hardware unit. Warranty data may be received, for example, from a manufacturer of the hardware unit, and historical failure data may be similarly received, or collected from failures of similar hardware units. A TTF, for example, may be expressed as a time interval such as 48 months, or 4 years. A "base" TTF may be useful as an initial value from which to calculate an adjusted or derated TTF.

Derating or adjustment of TTFs for at least one hardware unit may result from a slot manager analyzing the effects of interactions, such as reduced cooling, increased temperature, and voltage supply reduction and/or spikes, between hardware units and the electronic system. Adjusting one or more TTFs may be useful in increasing the accuracy of the TTFs, and of a corresponding method for recommending one or more hardware placement installation slots. The use of adjusted or derated TTFs by a method for selecting a slot to receive a new hardware unit may result in increased electronic system availability and decreased system downtime when compared to a hardware slot selection method that does not account for hardware unit and/or system interactions.

Embodiments of the present disclosure may be useful in extending a useful lifespan (expressed as a TTF) of one or more currently installed hardware units by repositioning the hardware unit(s) to slots which may offer more favorable operating conditions. For example, the lifespan (i.e., TTF) of a temperature-sensitive memory card which may be nearing the end of its useful life (small TTF value) may be extended by repositioning the memory card from a first slot receiving a certain volume of cooling air to a second slot that receives a greater volume of cooling air than the first slot.

In embodiments, calculated TTF values may be used by a slot manager in order to generate a hardware placement recommendations directed towards hardware lifespan trade-offs between various hardware units. Continuing with the previous example, a hardware unit having a relatively long TTF may be repositioned from a slot having favorable operating conditions in order to accommodate, in the slot, a hardware unit having a relatively short TTF. Hardware unit repositioning is further illustrated in detailed in FIG. 4 and the associated discussion.

Certain embodiments relate to a method for managing an electronic system configuration which may issue new hardware placement recommendations based upon current system data and hardware parameters for multiple types of hardware units both currently installed and pending installation. FIG. 1 includes a block diagram 100 and a table 106 depicting the management of electronic system 102 hardware configuration through a slot manager 116, according to embodiments of the present disclosure. Slot manager 116 may be useful in issuing, based upon a received set of hardware parameters 112 and system data 110, a set of new hardware placement recommendations 118.

Electronic system 102 may be a computer or computing system, server, network switching device or any type of electronic hardware designed with receptacles or slots (e.g., A-F) to receive replaceable, interchangeable hardware units. Hardware units may include, for example, memory modules, central processing units (CPUs), data storage hardware such as hard disk drives and solid-state drives, input/output (I/O) adapters, power supply units and other standardized electronic modules and/or assemblies. Hardware units may be designed to have standard dimensions and/or include standardized electrical connectors that allow them to be used interchangeably with similar hardware units with compatible slots within an electronic system.

Electronic systems may include a variety of sets of hardware unit slots, and each set may have a unique set of dimensional and connector characteristics. For example, an electronic system may have a set of memory slots, a set of I/O card slots and a set of processor card slots. For simplicity of illustration, FIG. 1 depicts a single set of six equivalent hardware unit slots (A-F) within electronic system 102. Hardware unit slots B, D and F are depicted in FIG. 1 as populated by hardware units BB, DD and FF, respectively. Hardware unit NN may represent a hardware unit pending installation into one of the hardware slots A, C or E.

Hardware unit dimension standards may include those such as the "rack unit", standard for the height of equipment designed to mount in a 19-inch or a 23-inch rack. For example, one rack unit (U) may be 1.75 inches (4.445 cm) high. Standardized electrical connector types may include, but are not limited to AT Attachment (ATA), Serial ATA (SATA), Integrated Drive Electronics (IDE), Peripheral Component Interconnect (PCI) and Peripheral Component Interconnect Express (PCIe).

Slot manager 116 may include software and/or firmware and may be located in a system external to the electronic system 102 or on a service processor (system maintenance) device within electronic system 102. Slot manager 116 may receive, as input, a set of system data 110, a set of hardware parameters 112, data from a data repository 114 and input from user input device 104. Slot manager 116 may subsequently generate a hardware placement recommendation 118 for a new hardware unit (e.g., NN) as a result of executing a method for managing an electronic system configuration that makes use of the received input.

Hardware parameters 112 may include one or more sets of parameters corresponding to at least one hardware unit that is currently installed (e.g., BB, DD and FF) in electronic system 102, and one or more sets of parameters corresponding to hardware that is pending installation (e.g., hardware unit NN). Hardware parameters may be generally useful for specifying various hardware characteristics such as hardware unit slot requirements, operating characteristics and predicted TTFs. Examples of various types of hardware parameters are described below; however, these are not intended to limit the present disclosure. Other types of hardware parameters may be used to specify hardware characteristics.

Hardware parameters 112 may include hardware unit slot requirements, hardware unit operating characteristics, hardware unit operational history, historical failure data, warranty data and hardware unit TTF derating factors.

In certain embodiments, hardware unit slot requirements may be used to specify the requirements that a particular hardware unit may have of a "host" slot (e.g., A-F) within an electronic system (e.g., 102) to ensure specified, reliable functioning of the hardware unit. Hardware unit slot requirements may be useful in determining if a particular hardware slot is suitable for a particular hardware unit. Hardware unit slot requirements may include, for example, a specified connector type and a set of specified slot dimensions that allow the slot to electrically and physically accommodate the hardware unit. Hardware unit slot requirements may also include a power supply voltage, maintained within a specified tolerance, over a specified range of supplied currents, for the hardware unit. Hardware unit slot requirements may also include a specified range of cooling air temperatures for the slot, in conjunction with a specified minimum cooling airflow, in order to maintain, during operation, the hardware unit's operating temperature within a specified operating range.

In certain embodiments, hardware unit operating characteristics may be used to specify characteristics of a hardware unit that may affect other hardware units and/or the host electronic system. Hardware unit operating characteristics may be useful for determining the compatibility of a hardware unit with other hardware units and/or the host electronic system.

Hardware unit operating characteristics may include, for example, a peak and/or average power dissipation of a hardware unit and peak voltage transient levels which may be generated by the hardware unit while in operation. Hardware unit operating characteristics may also include the hardware unit's sensitivity or response to (externally generated) voltage transient levels, and an indication of whether the hardware unit is hot pluggable or not.

In certain embodiments, hardware unit operational history may be used to specify key aspects or events of a hardware unit's past operation which may affect its present and future reliability. Elements of a hardware unit's operational history may be useful as input to a failure prediction model, which may be used by a method for managing electronic system configuration that is executed by a slot manager. Hardware unit operational history may include a number of power-on hours (POH) for the hardware unit, and minimum/maximum/average values for parameters such as operating voltage, power dissipation, measured hardware unit temperature and cooling air temperature. Hardware unit operational history may also include a record of past failures and corresponding repair actions for the hardware unit. Each of these historical parameters may be useful in generating an adjusted TTF for the hardware unit.

In certain embodiments, historical failure data may be used to specify failure times and failure modes recorded for similar or consistent hardware units. Historical failure data may represent reliability characteristics and failure anomalies of similar hardware units, and may be useful as input to a failure prediction model. Historical failure data may include such parameters as minimum/maximum/average TTF as well as particular known causes of failure harvested from other or similar electronic systems.

In certain embodiments, warranty data may be used to estimate TTFs for a particular type of hardware unit. Warranty data may represent reliability characteristics and failure anomalies of similar hardware units, may be based on historical failure data, and may be useful as input to a failure prediction model. Warranty data may include an expected TTF as specified by the manufacturer the hardware unit.

In certain embodiments, hardware unit TTF derating factors may be used to estimate TTFs for a particular type of hardware unit. Hardware unit TTF derating factors may represent a decrease in expected TTF, for a particular hardware unit, which is based upon known interactions with other hardware units and/or electronic system. For example, a hardware unit TTF derating factor may be used to decrease a predicted TTF for a first hardware unit in response to reduced cooling of the first unit resulting from a second hardware unit installed adjacent to the first. Hardware unit TTF derating factors may be calculated from a number of parameters described herein, and may be useful as input to a failure prediction model.

In certain embodiments, the hardware parameters 112 may be stored in a data repository 114. In certain embodiments the hardware parameters 112 may be stored in local or network storage devices external to the electronic system 102 or within a service processor (system maintenance) device or related data storage within electronic system 102.

System data 110 may include one or more sets of parameters corresponding to the configuration of electronic system 102. System data may be generally useful for specifying various characteristics of the operating environment and of hardware slots within an electronic system. Examples of various types of system data are listed below, however, these are not intended to limit the present disclosure; other types of system data may be used to describe the electronic system characteristics.

System data 110 may include environmental data, such as available power, voltage levels, and cooling airflow for each slot within the electronic system 102. Environmental data may also include specification of interactions between various hardware units within an electronic system, for example, the change of cooling airflow, voltage levels or available power that may be experienced by a first hardware unit in response to a second hardware unit being located adjacent to the first. System data 110 may also include system configuration data used to indicate a slot location and a hardware type of at least one hardware unit (e.g., BB, DD and FF) installed in the electronic system 102. For example a hardware type may be double data rate type three ("DDR3") and a slot location may be "D".

In certain embodiments, data repository 114 may include hardware parameters 112 and system data 110, and may be useful for making data such as historical failure data and hardware unit TTF derating factors that represent a number of electronic systems (e.g., 102) available for use by a slot managers (e.g., 116) of multiple electronic systems. Sharing of hardware parameters 112 and system data 110 may allow slot managers of multiple electronic systems to make use of a wealth of shared system and hardware unit data that would be unavailable to a single, isolated electronic system 102. Data repository 114 may be located on a local storage device such as a hard disk drive, on a network-accessible drive, or may be cloud-based.

User input device 104 may be used to gather data regarding the hardware unit (e.g., hardware unit NN) to be installed into electronic system 102, and in certain embodiments, may be used to provide input two and interaction with a slot manager program 116. In certain embodiments a hardware ID such as a model number or serial number may be received from user input device 104, from which slot manager 116 can identify the hardware and its associated characteristics. In certain embodiments, data such as the type of hardware unit (e.g., memory module), its characteristics (e.g., memory slot type, power requirements and cooling requirements) may be received by slot manager 116 from user input device 104. Types of user input devices 104 may include, but are not limited to, a personal computer (PC), a laptop, smartphone or other mobile device. In certain embodiments, slot manager 116 may receive notification of a new hardware unit (pending install) from an automated hardware updating program, or a maintenance scheduling program.

Slot manager 116 may receive, in the form of one or more data files, system data 110 and hardware parameters 112, and in response, apply them to a failure prediction model. The failure prediction model may subsequently generate hardware unit predicted TTF values for a plurality of locations (slots) within the electronic system, as represented in table 106. Generated TTFs may be useful for evaluating and comparing a variety of electronic system configuration options.

A failure prediction model may be implemented as an algorithm or method, executed by a computer program which may employ mathematical formulas, and make numerically-based decisions. A failure prediction model may receive one or more TTF values, for example, from hardware parameters 112, in the form of historical failure data and/or warranty data. The received TTF values may represent a predicted time to failure for a first hardware unit in a "standalone" system configuration, i.e., one in which other installed hardware units do not have any effect on the TTF of the first hardware unit. These received TTF values may represent a "maximum" or "best case" TTF, as specified by warranty or historical failure data.

Application of received hardware and system data, including TTF values, to the failure prediction model may produce one or more "adjusted" (altered or decreased) TTF values which may account for interactions between hardware units and/or the electronic system. By way of example, table 106 may include a mix of both "initial" (from hardware parameters 112) and "adjusted" (by the failure prediction model) TTF values.

Interactions may occur between hardware units and/or an electronic system which may decrease the reliable lifespan or TTF of a particular hardware unit. Interactions may include an increase in cooling air temperature (at a hardware unit), or decrease in available cooling airflow resulting from the operation and location of one or more hardware units within the electronic system. Interactions may also include a decrease in a supply voltage or available current or an increase in supply voltage excursions (transients) for a particular hardware unit. Interactions between hardware units and the electronic system may also include failure of components common to one or more hardware units such as a cooling apparatus (e.g., fan or blower), or a common power supply unit. Generally, a hardware unit added to any slot of an electronic system may alter a predicted TTF of a hardware unit in any other slot within the electronic system, including adjacent slots. Other types of interactions, between hardware units and/or an electronic system, which may affect the TTF of a particular hardware unit, may be possible.

In certain embodiments, a failure prediction model may be used to calculate a set of hardware unit predicted TTFs corresponding to a hardware unit installed in at least one of plurality of locations in the electronic system. Parameters such as hardware unit TTF derating factors, hardware unit operating characteristics and hardware unit operational history corresponding to interactions between two or more of the at least one hardware unit installed in the electronic system may be applied to the failure prediction model.

In certain embodiments, a set of weighting factors and/or a set of thresholds may be used as part of failure prediction model to generate an adjusted TTF for at least one hardware unit to be installed in and/or already installed in the electronic system. One or more weighting factors may be used to quantitatively specify the effects of interactions between hardware units and/or a host electronic system upon TTFs of one or more hardware units.

The following table specifies example weighting factors that may apply to hardware units:

TABLE 1

| Weighting Factors | | |
|---|---|---|
| Hardware Parameter | Units | Weighting Factor |
| Average operating temp above nominal ($T_{AVG} - T_{NOM}$) | ° C. | A |
| Peak operating temp above nominal ($T_{PEAK} - T_{NOM}$) | ° C. | B |
| Peak supply voltage above nominal ($VDD_{PEAK} - VDD_{NOM}$) | mV | C |
| Operating time ($T_{OPER}$) | Hours | D |
| Warranty duration ($T_{WAR}$) | Months | E |

A hardware unit TTF derating factor "F" may be calculated using the parameters and weighting factors from the table above. For example:

$$F=((T_{AVG}-T_{NOM})*A)+((T_{PEAK}-T_{NOM})*B)+ \\ ((VDD_{PEAK}-VDD_{NOM})*C)+(T_{OPER}*D)+ \\ (T_{WAR}*E)$$

The above equation illustrates a possible calculation of a hardware unit TTF derating factor based upon a variety of weighting factors. Other equations and weighting factors may be used.

In certain embodiments a "base" TTF, which may be received as a part of warranty data, may be multiplied by a hardware unit TTF derating factor "F" to produce an "adjusted" TTF ($TTF_{ADJ}$) that may account for interactions between hardware units and/or the electronic system:

$$TTF_{ADJ}=TTF*(1-D)$$

for example, where;
  TTF=36 and
  D=0.1

$$TTF_{ADJ}=36*(1-D)$$

$$TTF_{ADJ}=32.4$$

Times to failure (TTF) and adjusted times to failure ($TTF_{ADJ}$) may be specified in any chronological unit, for example, years, months or weeks.

One or more threshold may be used by the failure prediction model in the calculation of an adjusted TTF ($TTF_{ADJ}$). A threshold may be used, for example, by the failure prediction model to distinguish interactions between hardware units and/or the electronic system that are numerically significant from those that may have little or no effect on an adjusted TTF.

As an example, a supply voltage transient caused by a first hardware unit may cause a decrease in TTF for a second hardware unit that may receive the transient on its voltage supply. In a particular electronic system voltage transients below 5 mV may not have any measurable effect on TTF for the second hardware unit. A threshold value of 5 mV may therefore be used by a failure prediction model to eliminate supply voltage transient interactions between hardware units that may not produce significant changes in a TTF.

Thresholds may also be used to categorize interactions between hardware units and resulting effects on TTFs. Continuing with the previous example, supply voltage transient thresholds may be set at 5 mV, 20 mV, 50 mV and 100 mV within the failure prediction model. Supply voltage transients originating from a first hardware unit that lie in a range between two bounding threshold values (e.g., 5 mV and 20 mV) may result in a certain reduction in TTF to a second hardware unit. Thresholds may be useful in cases where data associating hardware interactions and TTF changes is sparse, or where the association is sufficiently specified by using data ranges rather than by an equation.

Table 106 may represent TTFs, calculated using a failure prediction model, that correspond to the placement of a new hardware unit NN in one of three possible available slots, A, C or E, within the electronic system 102. The column labeled "NN slot" may contain the name of the (open) slot of the electronic system 102 that may receive the new hardware unit NN. The columns labeled "Time to Failure" may contain TTFs or adjusted TTFs for each installed hardware unit in a particular configuration. The column labeled "Shortest TTF" may contain the shortest or smallest TTF of the TTFs listed within a particular row. The shortest TTF value of a particular row may represent the TTF of a hardware unit that is predicted to fail first, for a given electronic system configuration.

Each row of table 106 represents a set of TTFs corresponding to the placement of new hardware unit NN into a particular slot of electronic system 102. For example the first row (NN Slot is "A") includes to a set of TTFs corresponding to the placement of new hardware unit NN into slot A of the electronic system 102. Similarly, the other rows may include a set of TTFs corresponding to the placement of new hardware unit NN into slots C and E, respectively, of the electronic system 102.

A failure prediction model may include adjusted TTF values into table 106. For example, in the "A" row of the table, the TTF of hardware unit BB may be reduced from an original TTF (possibly received from warranty data) of 36 to an adjusted TTF of 34, resulting from the placement of hardware unit NN into slot A. Similarly, in this example, the placement of new hardware unit NN adjacent to any existing hardware unit may result in a derating of the TTF of the existing hardware unit by 2. The TTF values in table 106 may represent any chronological unit, (e.g., years, months or weeks) of time remaining until a predicted failure of a particular hardware unit.

Value 108 in table 106 represents the greatest value of the "shortest" TTF (per row) within the table 106, which may correspond to a recommendation to install the new hardware unit NN into slot A of the electronic system 102. This recommendation may be useful to extend or maximize the uptime of an electronic system 102 until a scheduled maintenance operation.

A method for managing a configuration of an electronic system may employ one or selection criteria to select one or more hardware unit configuration options for the electronic system 102. Selected configuration options may be included in a hardware placement recommendation 118.

In certain embodiments a selection criteria may be used to select one or more hardware unit placement options which may result in a TTF for the electronic system 102 that is above a specified value or that is the highest of all possible TTFs for the electronic system 102. This selection criterion may be useful in creating hardware unit placement recommendations to minimize the electronic system 102 downtime.

In certain embodiments a selection criteria may be used to select one or more hardware unit placements which may result in matched or similar TTFs for multiple hardware units within the electronic system 102. This selection criterion may be useful in limiting the number of scheduled system maintenance operations by allowing grouping of hardware unit replacements.

In certain embodiments a selection criteria may be used to select one or more hardware unit placements which may result in a cumulative TTF for all new and installed hardware units that is above a specified value, or maximized. This selection criterion may be useful in extending the cumulative useful life of all the hardware units within the electronic system.

In response to the output of a failure prediction model, slot manager 116 may generate a hardware placement recommendation 118, which may contain one or more recommended installation locations for one or more new hardware units (e.g., NN). Recommendation 118 may be useful for advising a system administrator or system user regarding which hardware slots within electronic system 102 may be suitable for installation of one or more new hardware units (e.g., NN), and may be sent or issued to a user input device 104, sent via email, text message or other electronic communication.

Figure 2:
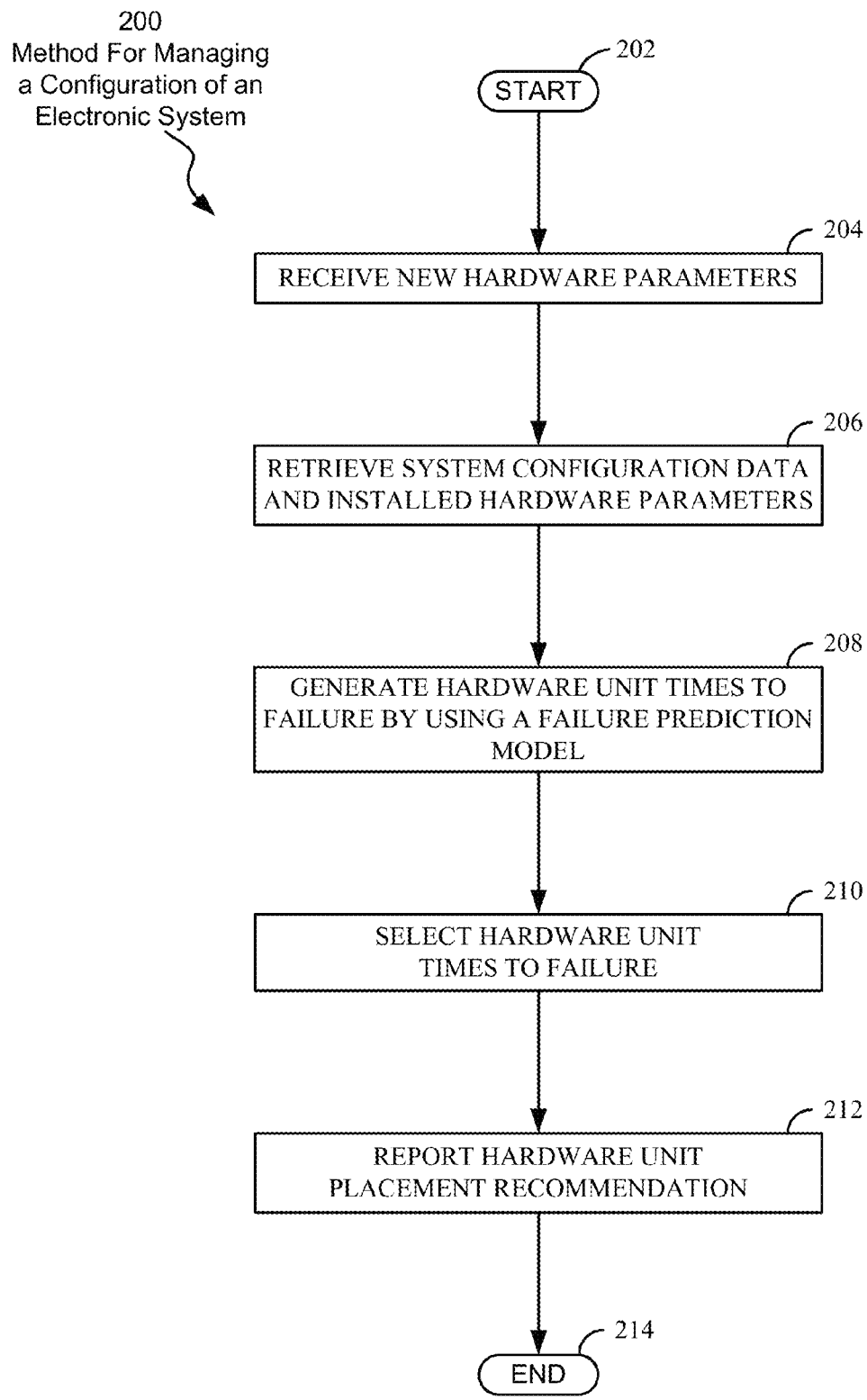
FIG. 2 is a flow diagram illustrating a method for managing a configuration of an electronic system, according to embodiments consistent with FIG. 1.

FIG. 2 is a flow diagram 200 illustrating a method for managing a hardware configuration of an electronic system (e.g., 102, FIG. 1) having a plurality of locations, each configured to receive a hardware unit, according to embodiments consistent with FIG. 1. The method may be useful in managing electronic system maintenance schedules by evaluating the effects that a new hardware unit may have on predicted TTF of hardware units currently installed in the electronic system. The process 200 moves from start 202 to operation 204.

Operation 204 generally refers to receiving a set of hardware parameters corresponding to a hardware unit to be installed in the electronic system. In certain embodiments, receiving a set of hardware parameters may include receiving a set of hardware unit slot requirements and a set of hardware unit operating characteristics for the hardware unit to be installed in the electronic system. Received hardware parameters may correspond to a hardware unit to be added to, for the purpose of upgrading, the electronic system or may correspond to a hardware unit to be swapped out with an already installed hardware unit. Once the set of hardware parameters is received, the process moves to operation 206.

Operation 206 generally refers to retrieving configuration data for the electronic system and at least one set of hardware parameters for at least one hardware unit currently installed in the electronic system. Retrieving configuration data may include retrieving a location (slot) and type or ID of at least one hardware unit installed in the electronic system. Retrieving configuration data and hardware parameters may include retrieving historical failure data, hardware parameters, electronic system configuration data, operational history, environmental data and warranty data. The data may be retrieved from a local storage device, a network storage device or a data repository such as 114 (FIG. 1). Once the system data and hardware parameters are retrieved, the process moves to operation 208.

Operation 208 generally refers to generating a plurality of hardware unit predicted (adjusted) TTFs corresponding to a plurality of hardware units installed in locations within the electronic system. The plurality of hardware unit TTFs may be generated by applying historical failure data, hardware parameters, the electronic system configuration data, operational history, environmental data and warranty data to a failure prediction model. In certain embodiments, the failure prediction model may be used to create hardware unit predicted TTFs for multiple hardware units installed in multiple slots within the electronic system. Once the plurality of predicted TTFs is generated, the process moves to operation 210.

Operation 210 generally refers to selecting, based on a selection criteria, hardware unit predicted TTFs. In certain embodiments, a selection criteria may be used to select hardware unit predicted TTFs to maximize the availability (i.e., time until a scheduled hardware unit maintenance or replacement operation) of an electronic system (e.g., 102, FIG. 1). In certain embodiments, a selection criteria may be used to select hardware unit predicted TTFs to minimize the number of scheduled hardware unit maintenance or replacement operations on an electronic system (e.g., 102, FIG. 1). In certain embodiments, a selection criteria may be used to select hardware unit predicted TTFs to maximize the cumulative time to failure (TTF) of multiple hardware units within an electronic system (e.g., 102, FIG. 1). Once hardware unit predicted TTFs are selected, the process moves to operation 212.

Operation 212 generally refers to reporting one or more recommended locations for installation of at least one new hardware unit. In certain embodiments, a report (e.g., 118, FIG. 1) may include a single recommended location for installation of a new hardware unit, and in certain embodiments, a report may include a plurality of recommended locations. According to embodiments, a report may be used to indicate a recommended repositioning of hardware units installed within the electronic system in response to a selection criterion of operation 210. Once the recommended location is reported, the process 200 may end at block 214.

Figure 3:
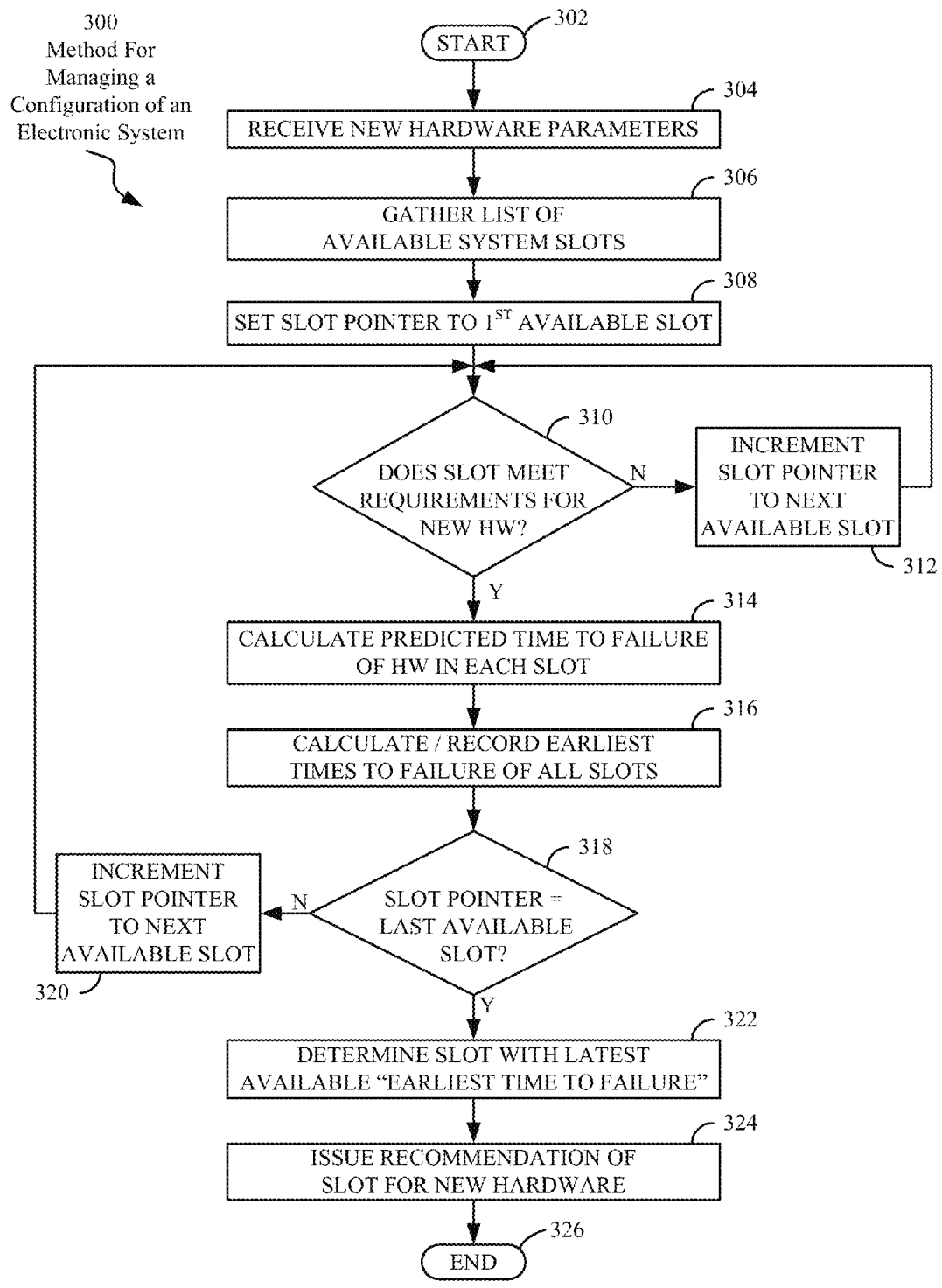
FIG. 3 is a flow diagram illustrating a method for managing a configuration of an electronic system, according to embodiments consistent with the figures.

FIG. 3 is a flow diagram 300 illustrating a method for managing a hardware configuration of an electronic system (e.g., 102, FIG. 1) having multiple hardware slots, according to embodiments consistent with the figures. The method may be useful in managing electronic system maintenance schedules by evaluating the effects of installing a new hardware unit on predicted TTFs of hardware units currently installed in the electronic system (e.g., 102, FIG. 1). The method illustrated by FIG. 3 may be understood to be consistent with, and providing a detailed example of, the method illustrated by FIG. 2.

The process 300 moves from start 302 to operation 304. Operation 304 generally refers to receiving a set of hardware parameters corresponding to at least one hardware unit to be installed in the electronic system. In certain embodiments, receiving a set of hardware parameters may include receiving a set of TTFs that are based on warranty or historical failure data for hardware units installed and pending installation to the electronic system (e.g., 102, FIG. 1). Once the set of hardware parameters is received, the process moves to operation 306.

Operation 306 generally refers to gathering a list of available system slots (new hardware unit installation locations). A list of available system slots may be contained within system data (110, FIG. 1) which may be accessed by slot manager (116, FIG. 1). The list of available system slots may be inserted into a data structure such as an array or linked list by the slot manager (116, FIG. 1) Once the list of available system slots is gathered, the process moves to operation 308.

Operation 308 generally refers to setting a pointer to indicate a first system slot available for the new hardware unit. The slot manager (116, FIG. 1) may set a software pointer, such as an index variable, to indicate a first available slot from the list of slots of operation 306. The pointer may be used by the slot manager to refer to a particular hardware unit slot within the electronic system (e.g., 102, FIG. 1) and data corresponding to characteristics of that slot. Once the pointer is set, the process moves to decision 310.

At step 310, a decision is made regarding whether the slot meets the hardware requirements of the new hardware unit. The hardware requirements of the new hardware unit may be contained in new hardware parameters received in operation 304, and requirements may include parameters such as connector type, voltage supply and power requirements, cooling airflow requirements, and size of the hardware unit. The new hardware unit's hardware requirements may be compared against system data gathered in operation 306, which may include information regarding slots within the system that corresponds to the hardware requirements. Each of the hardware requirements for the new hardware unit may be compared against the corresponding system configuration data for a particular slot. If the slot does not meet requirements for the new hardware unit, the process moves to operation 312. If the slot does meet requirements for the new hardware unit, the process moves to operation 314.

Operation 312 generally refers incrementing the slot pointer to correspond to the next available hardware unit slot. The slot manager (116, FIG. 1) may increment the slot pointer to point to a location in a data structure corresponding to the next available (open) hardware unit slot. Once the slot pointer is incremented, the process returns to decision 310.

Operation 314 generally refers to calculating or adjusting predicted TTFs of hardware units installed in each slot of the electronic system. Calculating adjusted TTFs may include modifying and initial TTF (received from hardware parameters 112, operation 304) by applying various TTF derating factors corresponding to interactions between hardware units and/or the electronic system (e.g., 102, FIG. 1). Once adjusted TTFs are calculated, the process moves to decision 316.

Operation 316 generally refers to calculating and recording the shortest TTF of the TTFs calculated in operation 304. The shortest TTF may be calculated as the smallest TTF of each of the calculated or adjusted TTFs for hardware that is installed or pending installation in the electronic system (e.g., 102, FIG. 1). The shortest TTFs for each possible placement of the new hardware unit within the electronic system (e.g., 102, FIG. 1) may be represented by the "shortest TTF" column in table 106 (FIG. 1). Once the earliest TTF is calculated and recorded, the process moves to decision 318.

At step 318, a decision is made regarding whether the slot pointer indicates a last available slot, from a list of available slots gathered in operation 306, for the new hardware unit. If the slot pointer does not indicate the last available slot for the new hardware unit, the process moves to operation 320. If the slot pointer does indicate the last available slot for the new hardware unit, the process moves to operation 322.

Operation 320 generally refers to incrementing the slot pointer to indicate the next available slot suitable for the new hardware unit. The slot manager (116, FIG. 1) may increment the slot pointer to point to a location in a data structure corresponding to the next available hardware unit slot. Once the slot pointer is incremented, the process returns to decision 310.

Operation 322 generally refers to selecting a slot with the longest available "shortest TTF" as calculated in operation 316. Selecting a slot may include comparing the "shortest TTF" (calculated in operation 316) for each possible location of a new hardware unit (e.g., NN, FIG. 1), and selecting the longest TTF from these shortest TTF values. For example, 108, FIG. 1 depicts a greatest value of the "shortest TTFs" in table 106, FIG. 1. Once the slot is selected, the process moves to decision 324.

Operation 324 generally refers to reporting a recommended location for installation of a new hardware unit. The issue recommendation may include one or more slot locations e.g., "A" or "C" (see FIG. 1), and may be issued to a system user or system administrator. After the recommended location is reported, the process 300 may end at block 326.

The method illustrated by FIG. 3 may be implemented in applications where there is at least one available slot within an electronic system (e.g., 102, FIG. 1), and the at least one available slot is compatible with a hardware unit (e.g., NN, FIG. 1) pending installation. In applications where at least one hardware slot is not available, or the slot is not compatible with a hardware unit (e.g., NN, FIG. 1) pending installation, the slot manager (116, FIG. 1) may issue a hardware placement recommendation (e.g., 118, FIG. 1) indicating the unavailability or incompatibility of a hardware slot for the hardware unit (e.g., NN, FIG. 1) pending installation.

Figure 4:
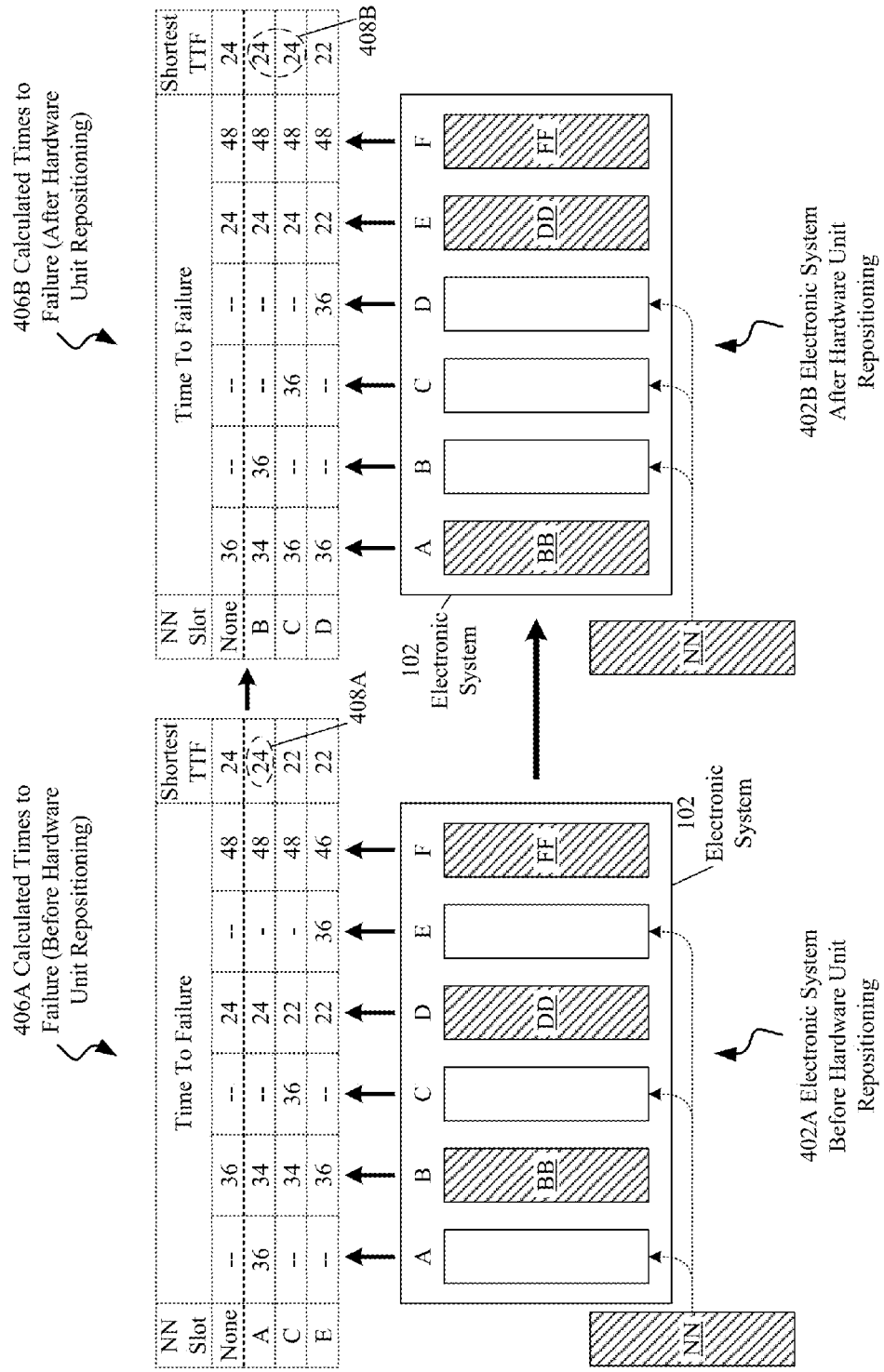
FIG. 4 includes two diagrams and two tables depicting the repositioning of hardware units within an electronic system, according to embodiments consistent with the figures.

FIG. 4 includes two diagrams 402A, 402B illustrating configurations of electronic system 102 and two tables 406A, 406B depicting calculated hardware unit predicted TTFs corresponding to the repositioning of hardware units within electronic system 102, according to embodiments consistent with the figures. FIG. 4 may be useful for illustrating a range of shortest TTF values and corresponding hardware placement recommendation(s) (e.g., 118, FIG. 1) which may result from repositioning of hardware units within an electronic system 102.

A method for managing a configuration of an electronic system corresponding to the results depicted in tables 406A, 406B may be consistent with the method described in reference to FIG. 1, FIG. 2. The method may receive as input (e.g., from user input device 104, FIG. 1) a selection criteria that may allow the repositioning of currently installed hardware units (e.g., BB, DD and FF), which may be useful in providing an expanded range of possible slots to receive a new hardware unit (e.g., NN).

For example, diagram 402A illustrates a set of three possible slots (A, C and E) which may receive new hardware unit NN, while diagram 402B illustrates a different set of three possible slots (B, C and D) which may receive new hardware unit NN. The "shortest TTF" columns of 406A and 406B illustrate two unique sets of calculated shortest TTFs, which may result in an expanded set of longest "shortest TTF" numbers which may be used as a basis for new hardware placement recommendations. The two respective sets 408A, 408B may result in two unique recommendations (e.g., hardware placement recommendation 118, FIG. 1) of possible slot locations to receive new hardware unit NN.

FIG. 4 depicts two possible configurations of existing hardware units within an electronic system 102, however more configurations may be possible. Allowing a method for managing a configuration of an electronic system to calculate TTFs for the repositioning of a plurality existing hardware units may provide an expanded range of hardware placement recommendations (e.g., 118, FIG. 1). An expanded range of hardware placement recommendations may be useful in offering an extended TTF for the electronic system 102, and/or providing a longer overall (cumulative) operating life for the hardware units within the electronic system.

Figure 5:
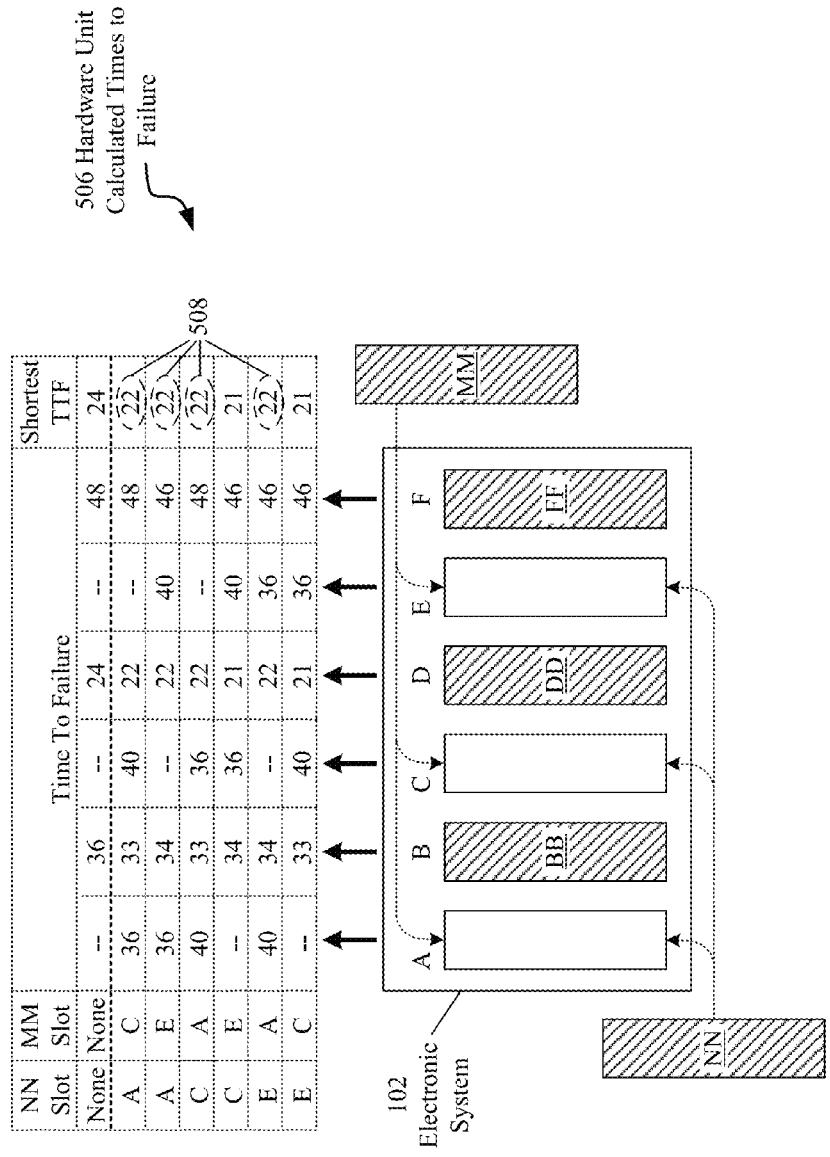
FIG. 5 includes a diagram and a table depicting the addition of two hardware units to an electronic system, according to embodiments consistent with the figures.

FIG. 5 includes a diagram of electronic system 102 and a table 506 depicting calculated hardware unit predicted TTFs corresponding to the addition of two hardware units to electronic system 102, according to embodiments consistent with the figures. FIG. 5 may be useful for illustrating a range of shortest TTF values and corresponding hardware placement recommendation(s) (e.g., 118, FIG. 1) which may result from addition of a plurality of hardware units to electronic system 102. In certain embodiments, multiple new hardware units may be added to an electronic system for the purpose of reconfiguring the system, or providing either longer overall hardware unit life and/or or a longer time to service or replacement (i.e., TTF) of one or more hardware units.

A method for managing a configuration of an electronic system corresponding to the results depicted in table 506 may be consistent with the method described in reference to FIG. 1, FIG. 2. The method may receive as input (e.g., from user input device 104, FIG. 1) a selection criteria, system data (110, FIG. 1) and hardware parameters (112, FIG. 1) that may allow the installation of a plurality of hardware units (e.g., NN and MM), which may be useful in providing an expanded range of possible slots to receive at least one new hardware unit.

For example, electronic system 102 illustrates a set of three possible slots (A, C and E) which may receive new hardware units NN and MM, the combinations of which are enumerated in the "NN slot" and "MM slot" columns of table 506. The "shortest TTF" columns of table 506 illustrate a set of calculated shortest TTFs resulting from the installation of two hardware units NN and MM, in various configurations, which may result in an expanded set 508 of greatest "shortest TTF" numbers which may be used as a basis for new hardware placement recommendations. The set 508 may result in an expanded number of recommendations (e.g., hardware placement recommendation 118, FIG. 1) of possible slot locations to receive new hardware units NN and MM.

FIG. 5 depicts configurations representing the installation of two new hardware units within an electronic system 102; however installation of a different number of hardware units may be possible. Allowing a method for managing a configuration of an electronic system to calculate TTFs for a plurality of newly installed hardware units may provide an expanded range of hardware placement recommendations 118, FIG. 1. An expanded range of hardware placement recommendations may be useful in offering an extended TTF for the electronic system 102, and/or providing a longer overall (cumulative) operating life for the hardware units within the electronic system.

In certain embodiments, hardware unit predicted TTFs may be calculated corresponding to the addition of two or more hardware units in conjunction with the repositioning of hardware units (see FIG. 4 and associated discussion) within an electronic system (e.g., 102). Calculating TTFs corresponding to the addition and repositioning of hardware units within an electronic system may result in expanded set of longest "shortest TTF" numbers, which may be used as a basis for new hardware placement recommendations.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
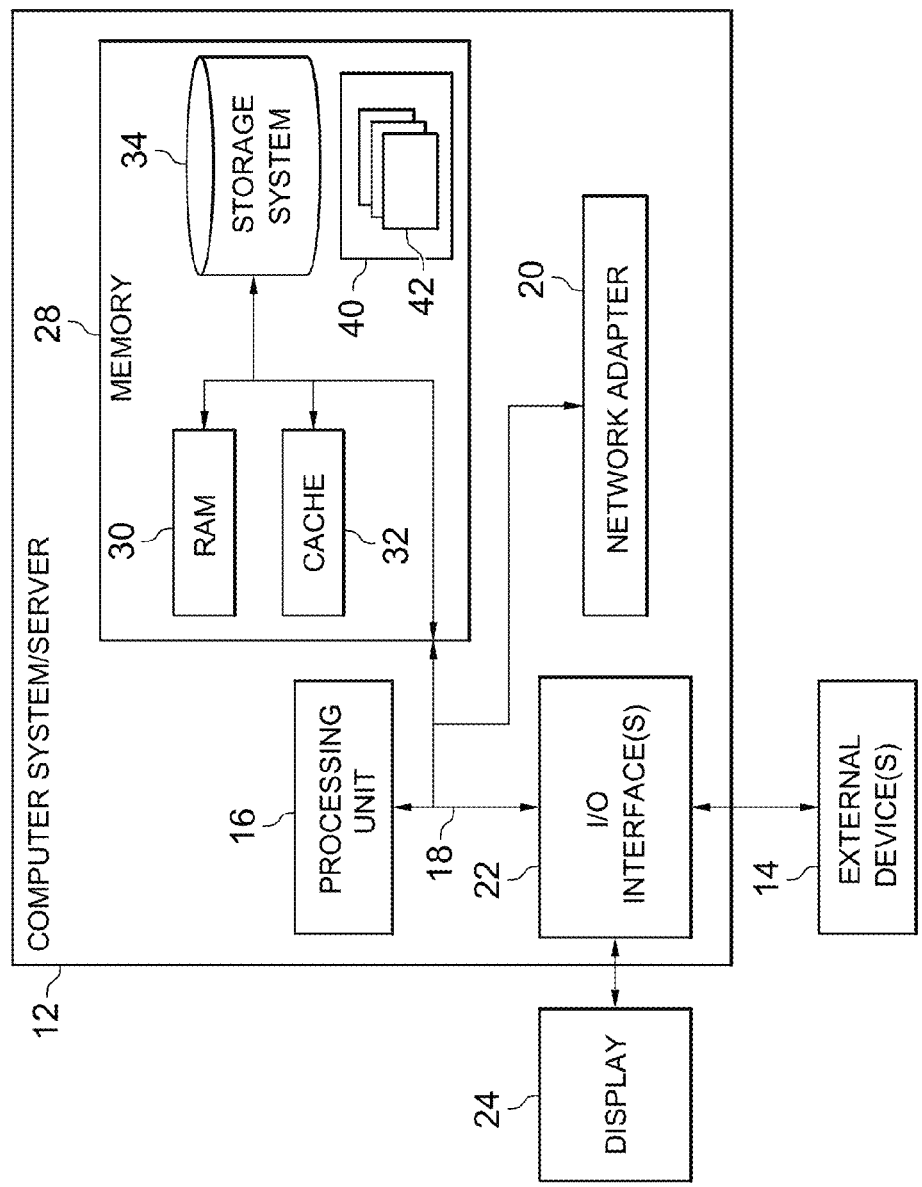
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
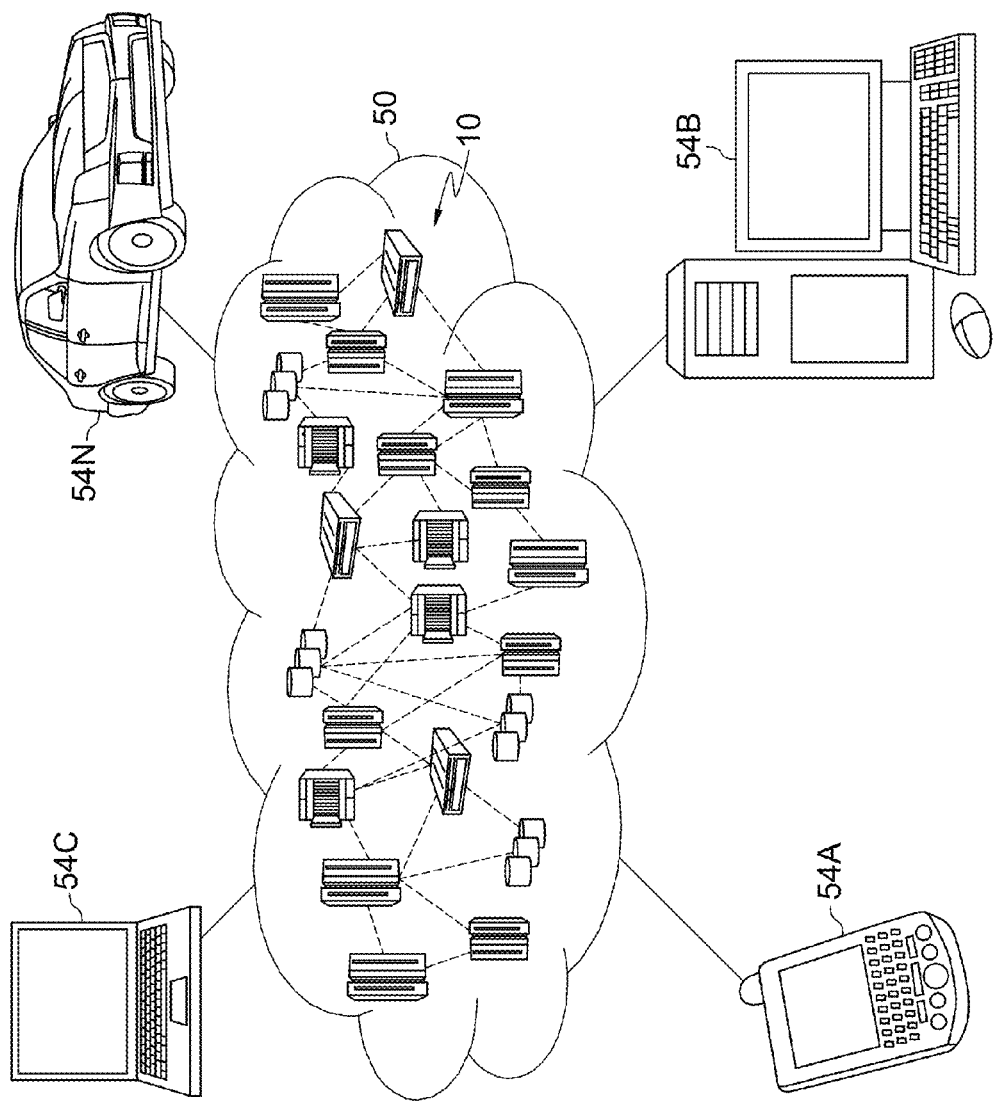
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
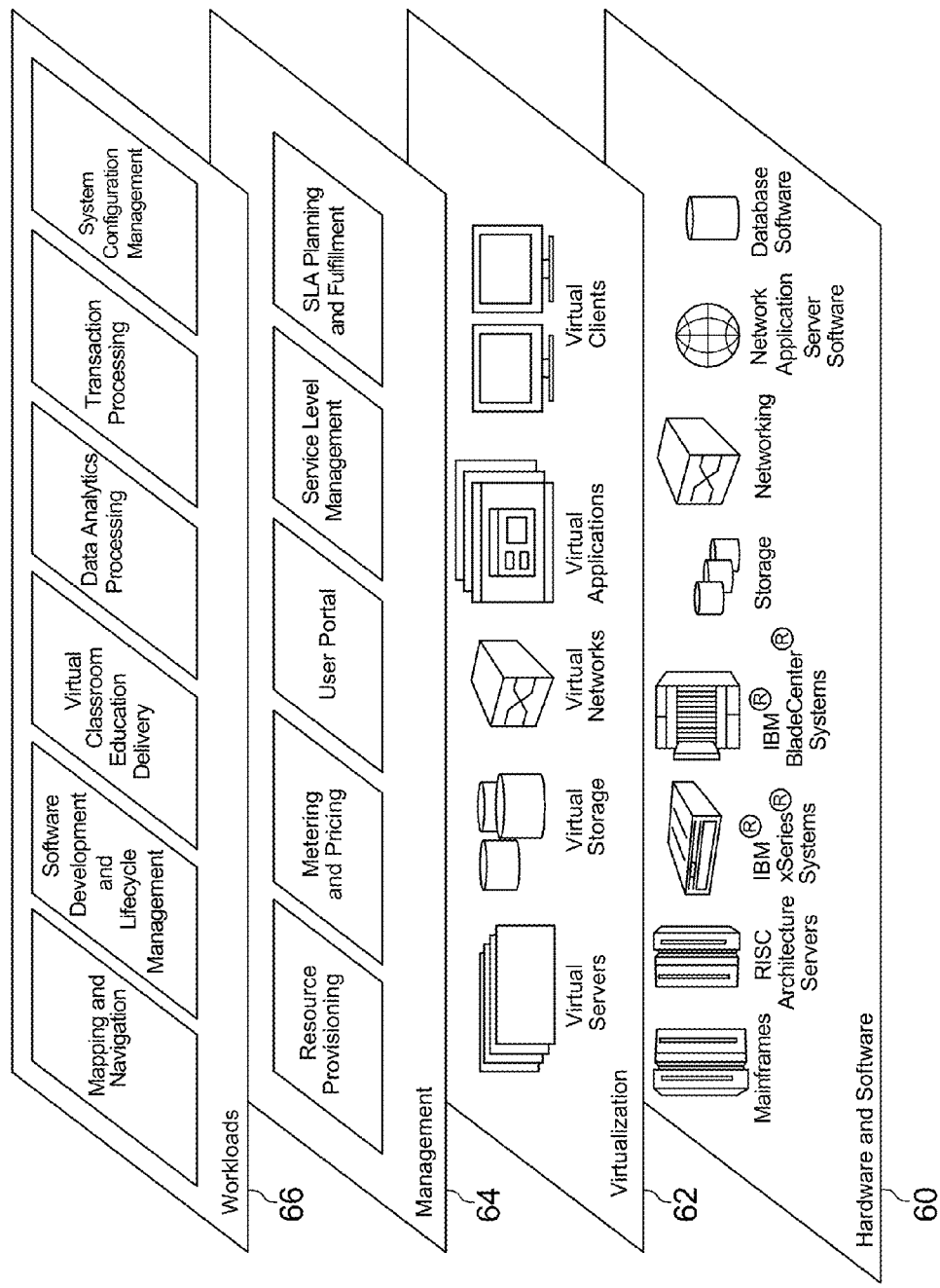
FIG. 8 depicts abstraction model layers according to an embodiment of the present invention.

Referring now to FIG. 8, a set of functional abstraction layers provided by cloud computing environment 50 (FIG. 2) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and system configuration management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for managing a configuration of an electronic system having a plurality of locations each configured to receive a hardware unit, the computer program product comprising:

a computer readable storage medium having stored thereon:
program instructions executable by one or more processor circuits to cause the one or more processor circuits to:
receive a set of hardware parameters corresponding to a hardware unit to be installed in the electronic system;
retrieve configuration data for the electronic system and at least one set of hardware parameters corresponding to at least one hardware unit installed in the electronic system;
generate a plurality of hardware unit predicted times to failure (TTFs) corresponding to a plurality of locations within the electronic system by applying, to a failure prediction model, the set of hardware parameters corresponding to the hardware unit to be installed in the electronic system, the configuration data for the electronic system, and the at least one set of hardware parameters;
select, based on a selection criteria, the plurality of hardware unit predicted TTFs corresponding to the plurality of locations;
report, based on the selected plurality of hardware unit predicted TTFs and for the hardware unit to be installed in the electronic system, a recommended location from the plurality of locations within the electronic system.

2. The computer program product of claim 1, wherein the program instructions are executable to further cause the one or more processor circuits to apply, to the failure prediction model, warranty data corresponding to the at least one hardware unit installed in the electronic system.

3. The computer program product of claim 1, wherein the program instructions are executable to further cause the one or more processor circuits to apply, to the failure prediction model, environmental data corresponding to the plurality of locations within the electronic system.

4. The computer program product of claim 3, wherein the program instructions are executable to further cause the one or more processor circuits to apply, to the failure prediction model, hardware unit TTF derating factors based on environmental data corresponding to the plurality of locations within the electronic system.

5. The computer program product of claim 1, wherein the program instructions are executable to further cause the one or more processor circuits to calculate a set of predicted TTFs of all of the at least one hardware unit installed in the electronic system.

6. The computer program product of claim 1, wherein the program instructions are executable to further cause the one or more processor circuits to calculate a set of hardware unit predicted TTFs corresponding to a hardware unit installed in at least one of plurality of locations in the electronic system.

7. The computer program product of claim 1, wherein the program instructions are executable to further cause the one or more processor circuits to calculate a set of hardware unit predicted TTFs corresponding to a repositioning, from a first location to a second location, of at least one hardware unit installed in the electronic system.

8. A system for managing a configuration of an electronic system having a plurality of locations each configured to receive a hardware unit, the system comprising: one or more processor circuits configured to:
receive a set of hardware parameters corresponding to a hardware unit to be installed in the electronic system;
retrieve configuration data for the electronic system and at least one set of hardware parameters corresponding to at least one hardware unit installed in the electronic system;
generate a plurality of hardware unit predicted times to failure (TTFs) corresponding to a plurality of locations within the electronic system by applying, to a failure prediction model, the set of hardware parameters corresponding to the hardware unit to be installed in the electronic system, the configuration data for the electronic system, and the at least one set of hardware parameters;
select, based on a selection criteria, the plurality of hardware unit predicted TTFs corresponding to the plurality of locations;
report, based on the selected plurality of hardware unit predicted TTFs and for the hardware unit to be installed in the electronic system, a recommended location from the plurality of locations within the electronic system.

9. The system of claim 8, wherein the one or more processor circuits are further configured to calculate a set of hardware unit predicted TTFs corresponding to an installation of a plurality of hardware units within the electronic system.

10. The system of claim 8, wherein the one or more processor circuits are further configured to calculate, for a plurality of hardware unit configurations of the electronic system and for a plurality of hardware units, an earliest hardware unit predicted TTF.

11. The system of claim 8, wherein the one or more processor circuits are further configured to apply a set of weighting factors to the set of hardware parameters corresponding to the hardware unit to be installed in the electronic system, the configuration data for the electronic system, and the at least one set of hardware parameters used in generating a plurality of hardware unit predicted TTFs.

12. The system of claim 8, wherein the one or more processor circuits are further configured to report, based on a comparison of a first hardware unit predicted TTF and a second hardware unit predicted TTF, a recommended location for the hardware unit to be installed in from the plurality of locations within the electronic system.

* * * * *